US012114593B2

(12) United States Patent
Stuart et al.

(10) Patent No.: US 12,114,593 B2
(45) Date of Patent: Oct. 15, 2024

(54) ADJUSTABLE WEDGE ASSEMBLY FOR CHANGING ANGLE ON DISK DRILL CLOSING WHEEL

(71) Applicant: CNH Industrial Canada, Ltd., Saskatoon (CA)

(72) Inventors: Graham Douglas Stuart, Warman (CA); Timothy David Quinney, Saskatoon (CA); Jesse Blair Pidwerbesky, Warman (CA)

( * ) Notice: Subject to any disclaimer, the term of this patent is extended or adjusted under 35 U.S.C. 154(b) by 751 days.

(21) Appl. No.: 17/357,607

(22) Filed: Jun. 24, 2021

(65) Prior Publication Data

US 2022/0408635 A1 Dec. 29, 2022

(51) Int. Cl.
*A01C 5/06* (2006.01)
(52) U.S. Cl.
CPC .................................. *A01C 5/068* (2013.01)
(58) Field of Classification Search
CPC ....... A01C 5/066; A01C 5/068; A01B 49/027; A01B 63/26
See application file for complete search history.

(56) References Cited

U.S. PATENT DOCUMENTS 3,705,560 A * 12/1972 Lappin ..................... A01C 7/08
111/151
11,399,456 B2 * 8/2022 Martin et al. .......... A01C 5/068
2015/0359162 A1 * 12/2015 Needham et al. ..... A01C 5/068
172/603
2021/0100158 A1 * 4/2021 Martin ................... A01C 7/006

FOREIGN PATENT DOCUMENTS

CA 2889032 A1 * 5/2014 ........... A01B 49/027

OTHER PUBLICATIONS

U.S. Appl. No. 17/357,492, filed Jun. 24, 2021, Graham Douglas Stuart.
U.S. Appl. No. 17/357,571, filed Jun. 24, 2021, Graham Douglas Stuart.

* cited by examiner

*Primary Examiner* — Tara Mayo
(74) *Attorney, Agent, or Firm* — Rebecca Henkel; Peter K. Zacharias; Rickard K. DeMille

(57) ABSTRACT

A row unit closing wheel assembly includes a closing wheel, a closing wheel arm, and a closing wheel shaft having a first end and a second end. The closing wheel is coupled to the first end and the closing wheel arm is coupled to the second end via a pivot joint. The row unit closing wheel assembly includes an adjustable mechanical assembly disposed at the pivot joint. The adjustable mechanical assembly is configured to adjust an angle of the closing wheel shaft relative to the closing wheel arm along a horizontal plane via movement of the closing wheel shaft about the pivot joint, the horizontal plane being orthogonal to a rotational axis of the pivot joint. The adjustable mechanical assembly includes interlocking teeth and is configured to utilize the interlocking teeth to adjust the angle.

20 Claims, 8 Drawing Sheets

ADJUSTABLE WEDGE ASSEMBLY FOR CHANGING ANGLE ON DISK DRILL CLOSING WHEEL

BACKGROUND

The present disclosure relates generally to agricultural implements.

Certain agricultural implements, such as disk drills, may be used to open trenches in a soil surface and to place agricultural product, such as seed or fertilizer, in the trenches. A disk drill may have several row units attached to a frame and arranged in a row. This arrangement may form several parallel rows of deposited agricultural product as the disk drill is pulled through a field by a tractor. Each row unit may include an opener disk that excavates a trench into the soil surface, a product chute configured to deposit the agricultural product into the trench, and a packing wheel (e.g., closing wheel) configured to pack the displaced soil on top of the agricultural product. Unfortunately, certain soil conditions (e.g., wetter soils, soils with high clay or silt content, soils with heavy field residue, etc.) keep the closing system from collapsing a sidewall of a seed trench, which negatively impacts seed germination, and ultimately yield.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In one embodiment, a row unit closing wheel assembly includes a closing wheel, a closing wheel arm, and a closing wheel shaft having a first end and a second end. The closing wheel is coupled to the first end and the closing wheel arm is coupled to the second end via a pivot joint. The row unit closing wheel assembly includes an adjustable mechanical assembly disposed at the pivot joint, wherein the adjustable mechanical assembly is configured to adjust an angle of the closing wheel shaft relative to the closing wheel arm along a horizontal plane via movement of the closing wheel shaft about the pivot joint, the horizontal plane being orthogonal to a rotational axis of the pivot joint, and wherein the adjustable mechanical assembly includes interlocking teeth and is configured to utilize the interlocking teeth to adjust the angle.

In another embodiment, an agricultural implement includes at least one row unit closing wheel assembly. The at least one row unit closing wheel assembly includes a closing wheel, a closing wheel arm, and a closing wheel shaft having a first end and a second end. The closing wheel is coupled to the first end and the closing wheel arm is coupled to the second end via a pivot joint. The at least one row unit closing wheel assembly includes an adjustable mechanical assembly disposed at the pivot joint. The adjustable mechanical assembly is configured to adjust an angle of the closing wheel shaft relative to the closing wheel arm along a horizontal plane via movement of the closing wheel shaft about the pivot joint, the horizontal plane being orthogonal to a rotational axis of the pivot joint. The adjustable mechanical assembly includes a first gear having a first plurality of teeth and a second gear of having a second plurality of teeth, the first plurality of teeth and the second plurality of teeth interface to form interlocking teeth, and the adjustable mechanical assembly is configured to utilize the interlocking teeth to adjust the angle.

In another embodiment, a system for changing an angle for a closing wheel includes an adjustable mechanical assembly configured to couple to both a closing wheel shaft and a closing wheel arm of a closing wheel assembly having the closing wheel. The adjustable mechanical assembly is configured to adjust the angle of the closing wheel shaft relative to the closing wheel arm along a horizontal plane via movement of the closing wheel shaft about a pivot joint coupling the closing wheel shaft to the closing wheel arm, the horizontal plane being orthogonal to a rotational axis of the pivot joint. The adjustable mechanical assembly includes a first gear having a plurality of teeth and a second gear of having a plurality of teeth, the first plurality of teeth and the second plurality of teeth interface to form interlocking teeth, and the adjustable mechanical assembly is configured to utilize the interlocking teeth to adjust the angle.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
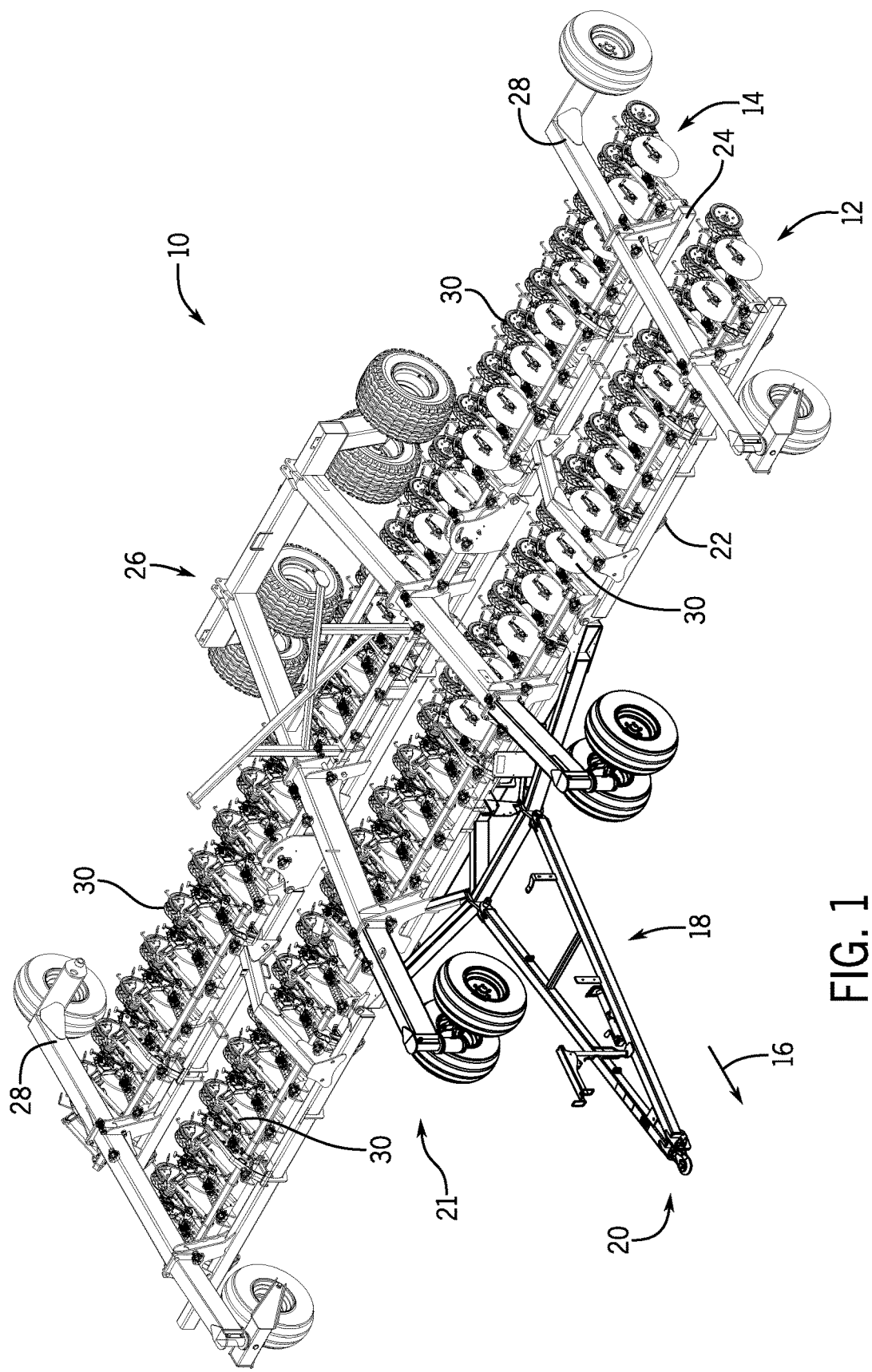
FIG. 1 is a perspective view of a disk drill with two rows of staggered row units, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The present disclosure is generally directed to agricultural implements, such as disk drills, capable of deposited agricultural product into a field. Disk drills may form several parallel trenches in the surface of a field as the disk drill is towed in a direction of travel, deposits agricultural product(s) within each trench, and packs displaced soil over the deposited agricultural product. The disk drill may include several row units, and each may form a respective trench as a disk of the respective row unit displaces soil. Each row unit may also include components (e.g., a product chute) that enable placement of an agricultural product, such as seed or fertilizer, in the respective trench. Each row unit may also include an independent packer wheel (e.g., closing wheel) that packs the displaced soil onto the deposited agricultural product to cover the respective trench formed by the disk. During operation of the disk drill, certain soil conditions (e.g., wetter soils, soils with high clay or silt content, soils with heavy field residue, etc.) keep the closing system from collapsing a sidewall of a seed trench, which negatively impacts seed germination, and ultimately yield.

As will be explained below, the embodiments below describe an adjustable mechanical assembly for adjusting an angle of a closing wheel to enable the closing wheel to properly close an open seed trench even under more challenging soil conditions. In some embodiments, a row unit closing wheel assembly includes a closing wheel, a closing wheel arm, and a closing wheel shaft having a first end and a second end. The closing wheel is coupled to the first end and the closing wheel arm is coupled to the second end via a pivot joint. An adjustable mechanical assembly is disposed at the pivot joint that utilizes interlocking teeth (e.g., of gears) to adjust an angle of the closing wheel shaft relative to the closing wheel arm along a horizontal plane via movement of the closing wheel shaft about the pivot joint. The horizontal plane is orthogonal to a rotational axis of the pivot joint.

Referring now to the drawings, FIG. 1 is a perspective view of a disk drill 10 with two rows 12, 14 of row units. The disk drill 10 may be towed by a tractor in a direction of travel 16. In the illustrated embodiment, the disk drill 10 includes an A-frame 18 and a hitch assembly 20, which may be coupled to a corresponding hitch assembly of the tractor. The A-frame 18 is coupled to a main frame 21 of the disk drill 10. In addition, the main frame 21 includes a first frame element 22 that supports a first row 12 of row units and a second frame element 24 that supports a second row 14 of row units. The frame elements 22 and 24 are connected to each other and supported by a central frame section 26 and side frame sections 28 of the main frame 21. Wheels are coupled to the central frame section 26 and the side frame sections 28 to facilitate movement of the disk drill 10 through the field. It should be understood that, while the disk drill 10 includes forty-eight row units 30 (e.g., closing wheel assemblies), arrangements with any number of row units 30 may be employed. As described in greater detail below, each row unit 30 (e.g., closing wheel assembly) may include an adjustable mechanical assembly for adjusting an angle of a closing wheel.

Figure 2:
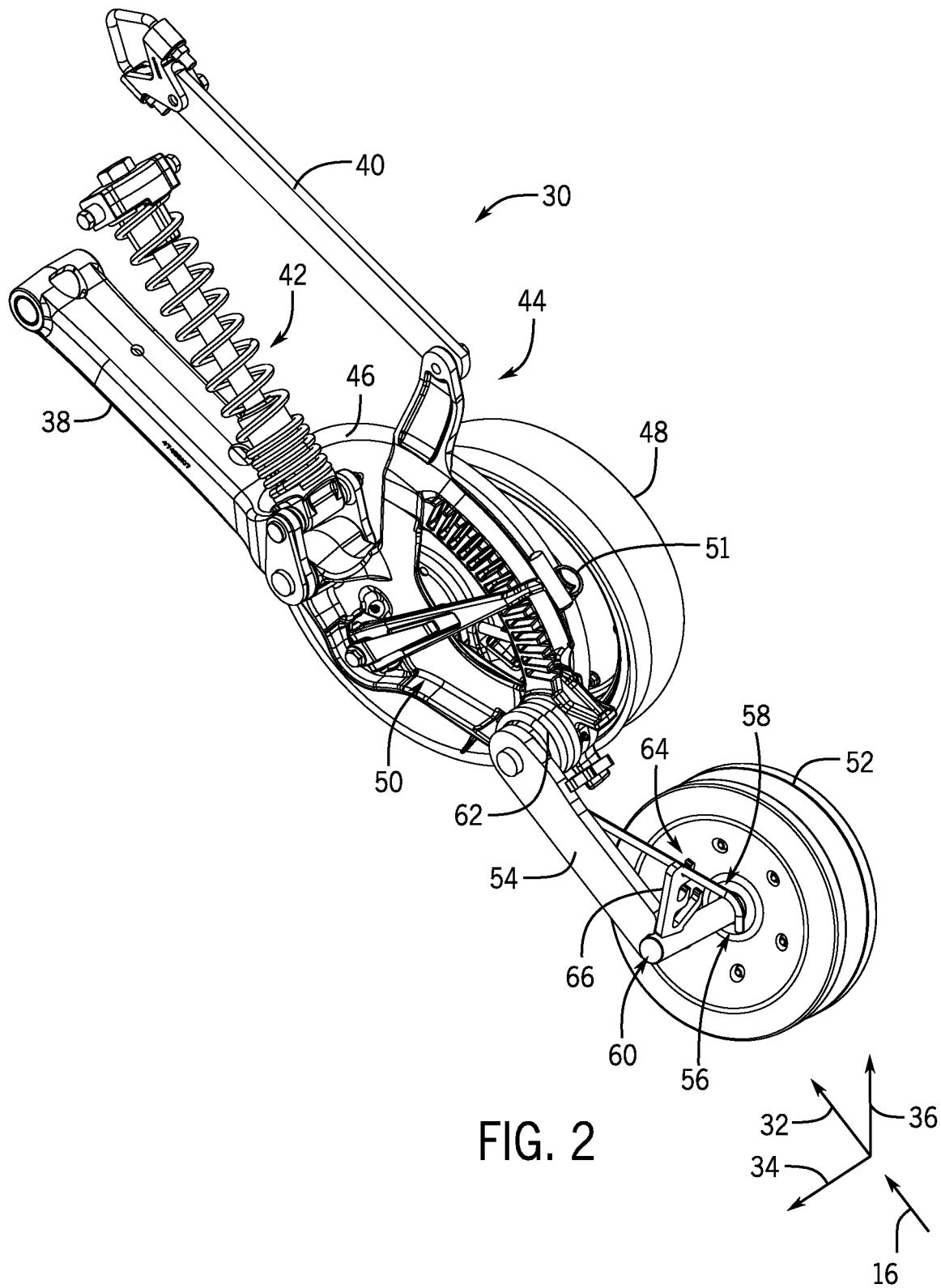
FIG. 2 is a perspective view of a disk drill row unit which may be used in the disk drill of FIG. 1, in accordance with an embodiment of the present disclosure.
Figure 3:
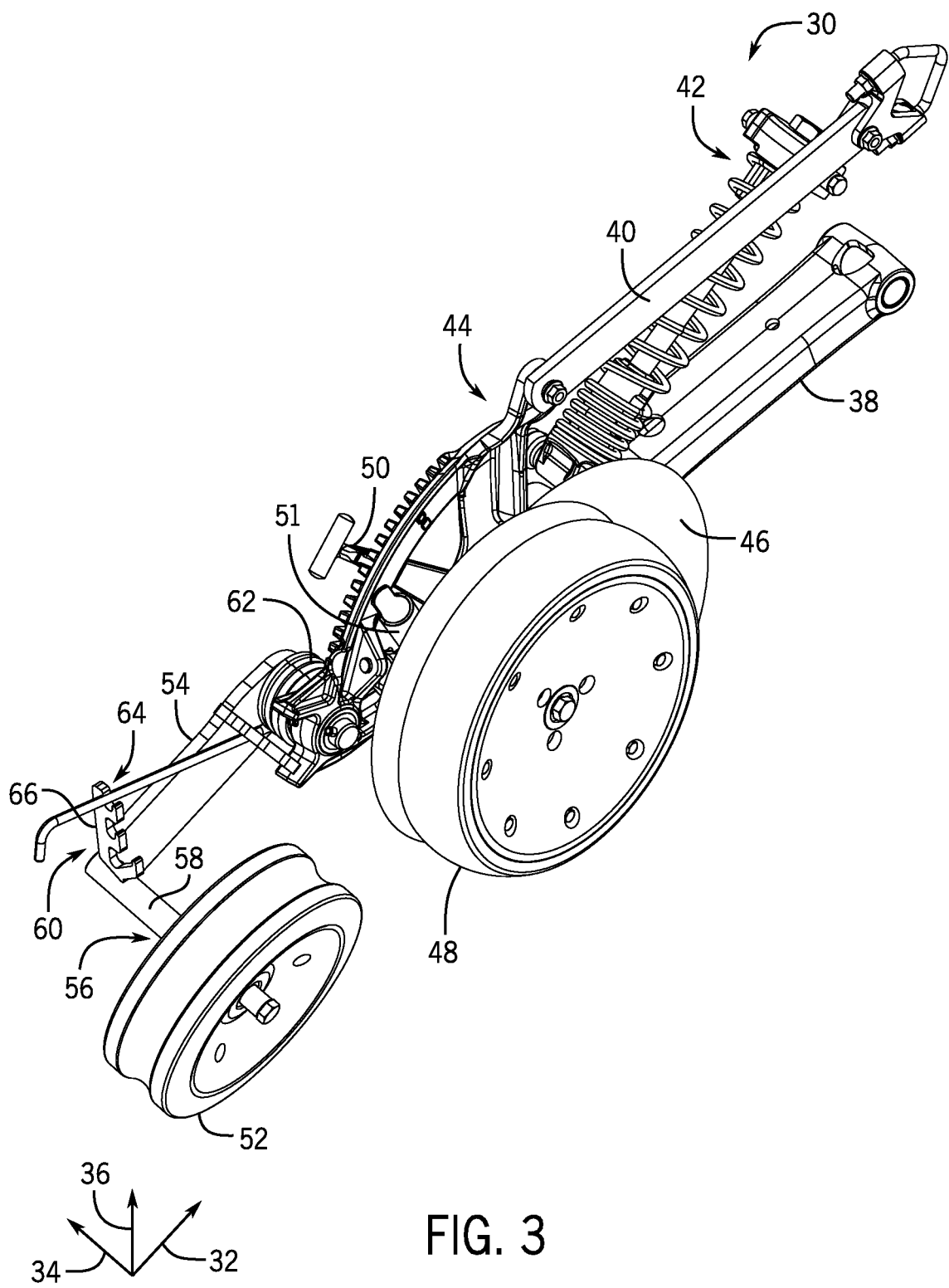
FIG. 3 is a perspective view of a disk drill row unit of FIG. 2, in accordance with an embodiment of the present disclosure.
Figure 4:
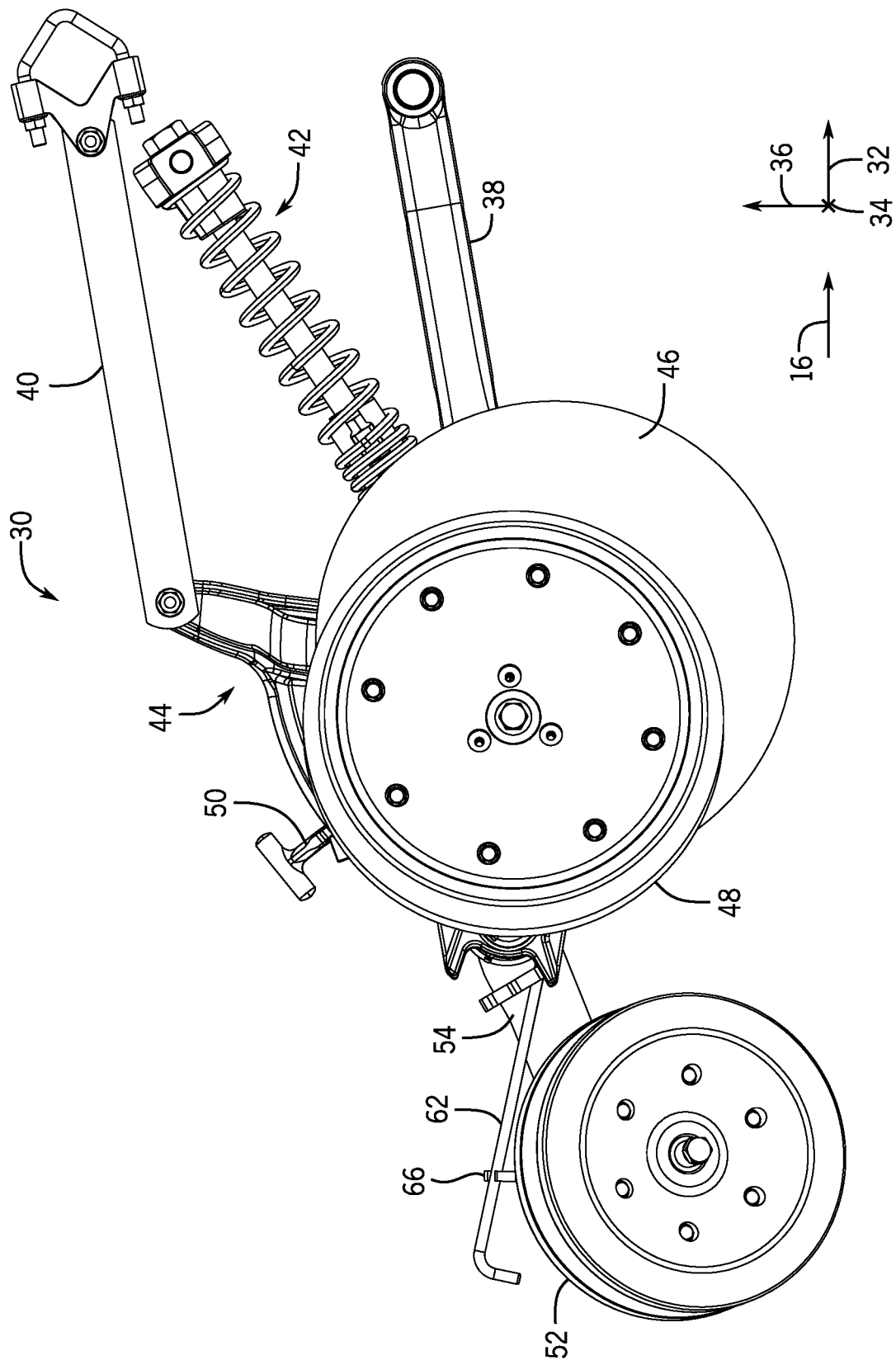
FIG. 4 is a side view of the disk drill row unit of FIG. 2, in accordance with an embodiment of the present disclosure.
Figure 5:
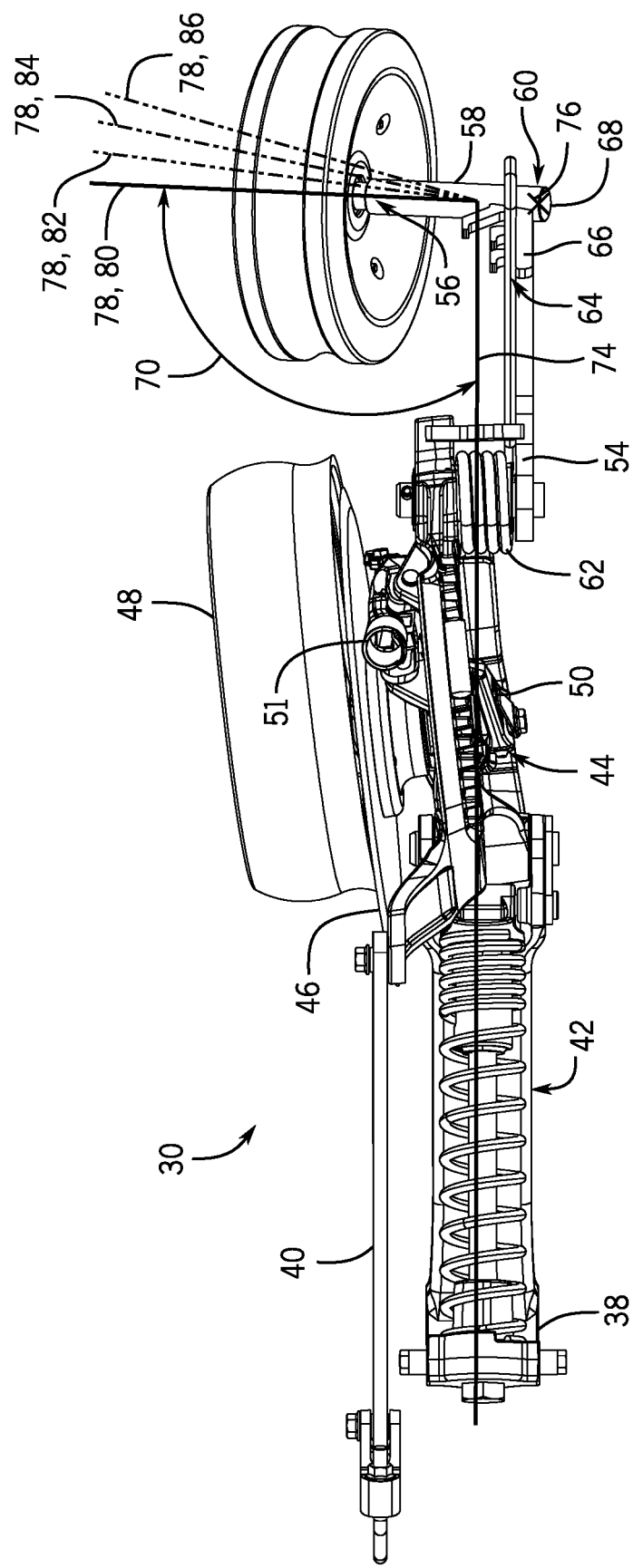
FIG. 5 is a top view of the disk drill row unit of FIG. 2, in accordance with an embodiment of the present disclosure.

FIGS. 2-5 are views of a row unit 30 that may be used in the disk drill of FIG. 1 (without the adjustable mechanical assembly shown). More specifically, FIGS. 2 and 3 are perspective views of the row unit 30, FIG. 4 is a side view of the row unit 30, and FIG. 5 is a top view of the row unit 30. The row unit 30 may be described with reference to a longitudinal axis or direction, 32, a lateral axis or direction 34, and a vertical axis or direction 36.

The row unit 30 includes links 38 and 40 and a damping assembly 42 (e.g., including a spring and a damper) that are configured to couple a frame 44 of the row unit 30 to the disk drill frame 21. The damping assembly 42 may be configured to force the frame 44 against the soil surface. Damping assembly 42 may also be configured to damp upward movement of the frame 44 as the row unit 30 encounters uneven ground. A disk 46 is rotatably coupled to the frame 44. The disk 46 is configured to form a trench in the soil. The depth of the trench may be controlled by the position of the disk 46 relative to a gauge wheel 48 along the vertical axis 36. The vertical position of the gauge wheel 48 may be controlled by a depth regulator handle 50, which in turn changes the depth that the disk 46 cuts the trench in the soil. An agricultural product (e.g., seed or fertilizer) may be disposed within the trench formed by disk 46 via a product chute or conduit 51.

Closing wheel 52 couples to the frame 44 with linkage 54 (e.g., closing wheel arm). Specifically, the closing wheel 52 is coupled to a first end 56 of a closing wheel shaft or spindle 58 and a second end 60 of the closing wheel shaft 58 is coupled to closing wheel arm 54. The closing wheel 130 may be substantially laterally aligned with disk 46 to cover a trench formed by disk 46 as the row unit 30 moves in direction of travel 16. The frame 44 also supports a spring 62 that urges the closing wheel 52 toward the soil surface. The torque applied by the spring 62 may be adjusted by placing an end of the spring 62 in one of a set of slots 64 in an adjustment plate or bar 66. The pressure of closing wheel 52 may therefore be adjusted depending on the soil type, the agricultural product dispensed, etc.

As shown in FIG. 5, the closing wheel shaft 58 is coupled to the closing wheel arm 54 via a pivot joint 68 that enables the closing wheel shaft 58 to be rotated relative to the closing wheel arm 54 (e.g., in a circumferential direction 69) to adjust an angle 70 of the closing wheel shaft 58 (and, thus, the angle 68 of the closing wheel 52) relative to the closing wheel arm 54 relative to a horizontal plane (indicated by line 74 extending in directions 32 and 34). A rotational axis 76 (extending into and out of the page) of the pivot joint 68 is orthogonal to the horizontal plane 74. In certain embodiments, the pivot joint 68 may be formed be a rod, shaft, pin, or bolt connection thru the adjacent ends of the closing wheel shaft 58 and the closing wheel arm 54. As described in greater detail below, an adjustable mechanical assembly may be coupled to both the closing wheel shaft 58 (e.g., directly) and the closing wheel arm 54 (e.g., directly or indirectly) and be configured to adjust the angle 70. Adjustments to change the adjustable mechanical assembly to change the angle 70 may occur in a tool-less manner.

The adjustable mechanical assembly may adjust the closing wheel shaft 58 relative to the closing wheel arm 54 (and, thus, the angle 70) between a number of fixed positions 78 associated with set angle points. The positions 78 may include an initial position 80 associated with an initial set angle point. The angle 70 for the initial set angle point at the initial position 80 is a substantially orthogonal angle (e.g., approximately 90 degrees±0.5 degrees). For example, the angle 70 for the initial set angle point may be approximately 90.5 degrees. The initial set angle point may be referenced as 0 degrees. Other fixed positions 78 (e.g., positions 82, 84, 86) are represented by dashed lines 82, 84, 86. The set angle points for positions 82, 84, 86 may have a difference of approximately 5 degrees, 7.5 degrees, and 10 degrees, respectively, relative to the initial set angle point. For example, in certain embodiments, the set angle points may have an angle of approximately 95.5 degrees, 98 degrees, and 100.5 degrees. The number of positions 78 and set angle points may vary (e.g., 2, 3, 4, 5 or more positions). In certain embodiments, the number of positions 78 may be finite. The value for the angle 70 of the set angle points relative to the initial set angle point may also vary. In certain embodiments, the difference in angle change between the set angle points may vary. In other embodiments, the difference in angle change between the set angle points may be constant. The value of the angle 70 for each set angle point (other than the initial set angle point) is greater than the value of the angle 70 for the initial set angle point.

Figure 6:
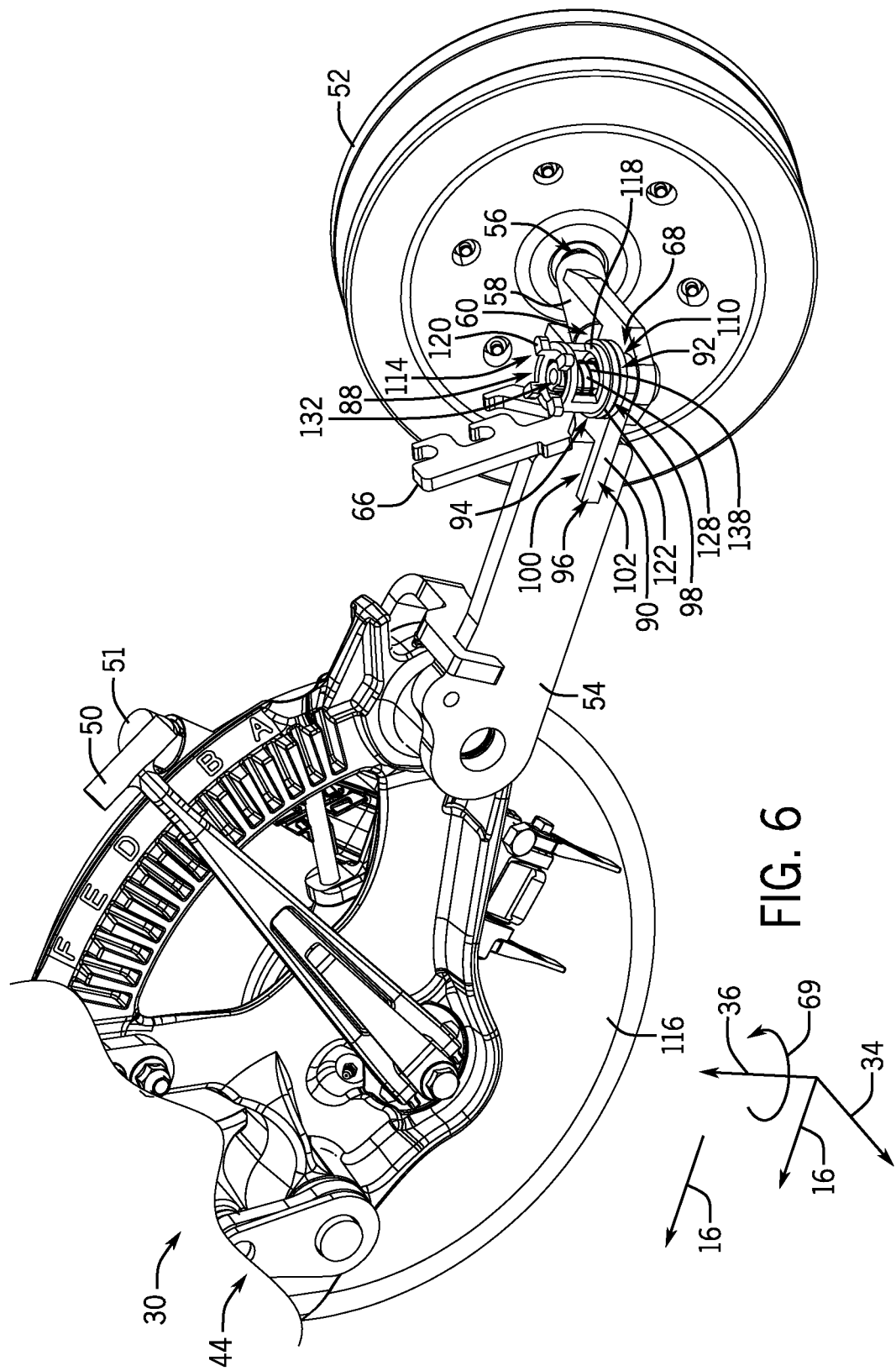
FIG. 6 is a perspective view of a portion of a disk drill unit with an adjustable mechanical assembly, in accordance with an embodiment of the disclosure.
Figure 7:
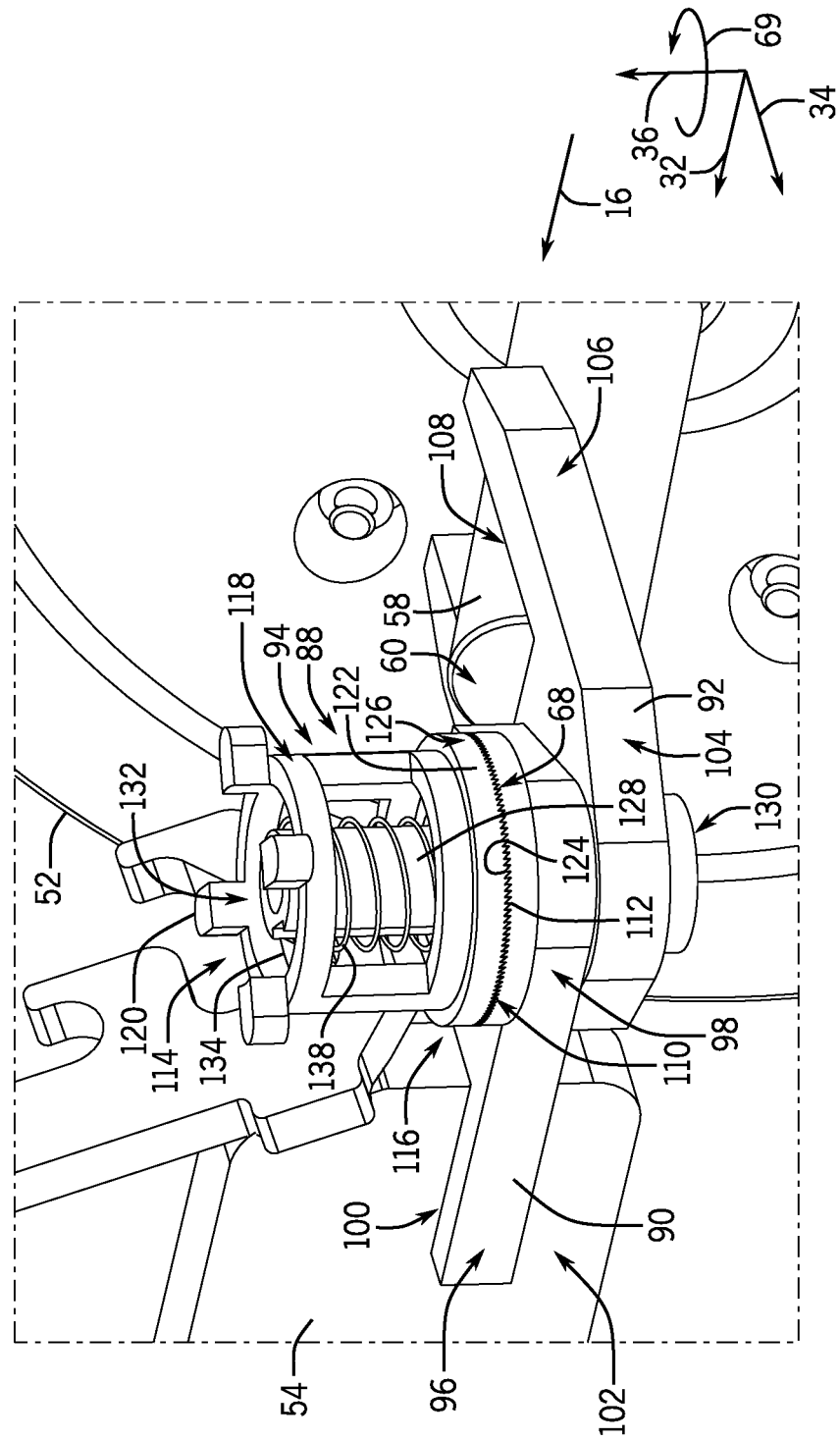
FIG. 7 is a perspective view of the adjustable mechanical assembly in FIG. 6, in accordance with an embodiment of the disclosure.
Figure 8:
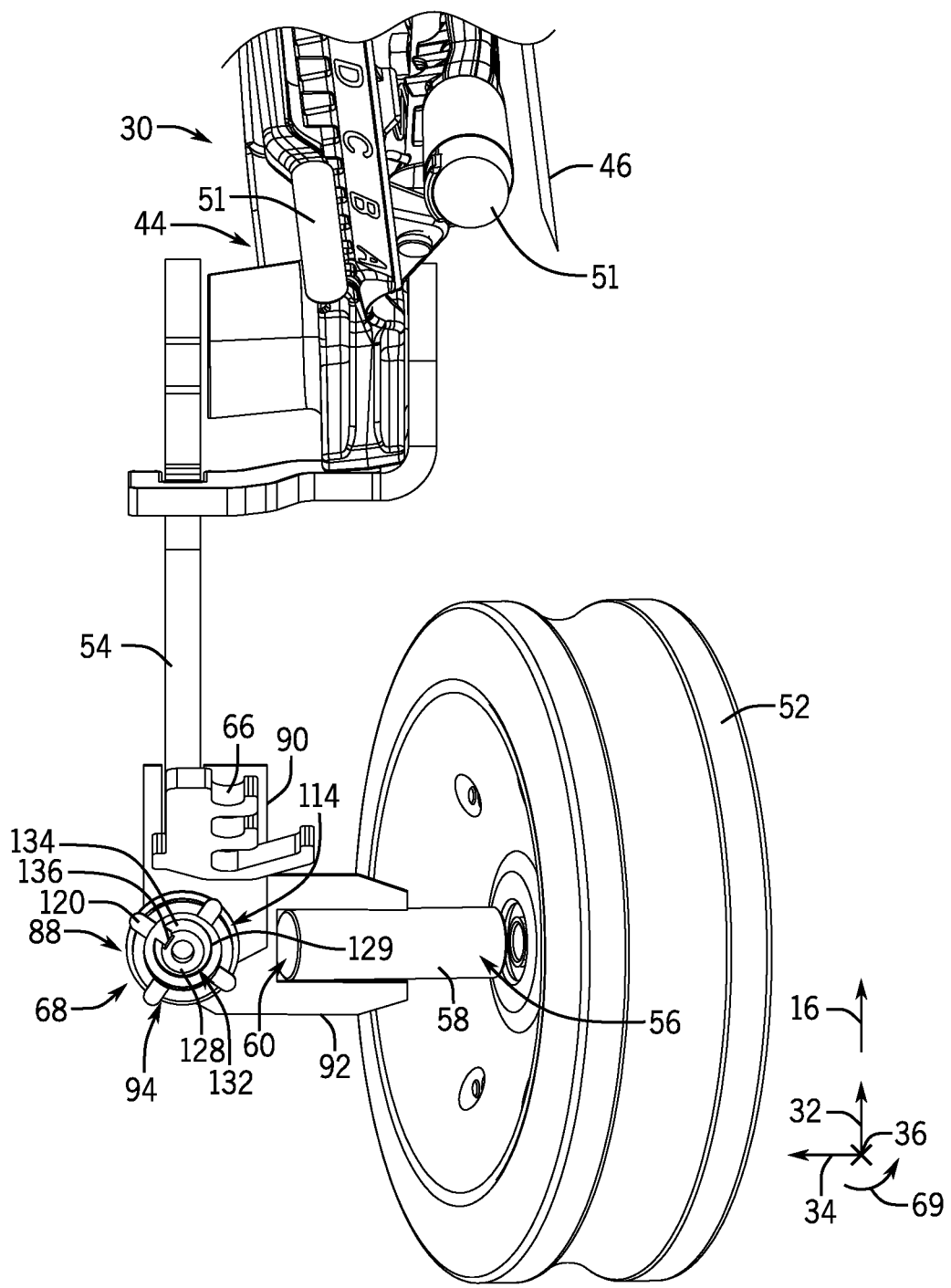
FIG. 8 is top view of a portion of the disk drill unit with the adjustable mechanical assembly in FIG. 6, in accordance with an embodiment of the disclosure.

FIGS. 6-8 illustrate different views of an adjustable mechanical assembly that may be utilized on the row unit 30 for adjusting an angle of the closing wheel 52. FIG. 6 is a perspective view of a portion of the disk drill row unit 30 with an adjustable mechanical assembly 88. FIG. 7 is a perspective view of the adjustable mechanical assembly 88 in FIG. 6. FIG. 8 is a top view of the portion of the disk drill row unit 30 with the adjustable mechanical assembly 88 in FIG. 6. The spring 62 in FIGS. 2-5 is not shown in FIGS. 6-8 to enable viewing of the adjustable mechanical assembly 88. The adjustable mechanical assembly 88 includes links 90 and 92 and a knob assembly 94. The adjustable mechanical assembly 88 is coupled to the closing wheel arm 54 via the link 90 and to the closing wheel shaft 58 via the link 92. In particular, the link 90 includes ends 96 and 98. The end 96 includes a slot 100 to receive an end 102 of the closing wheel arm 54. The end 96 of the link 90 and the end 102 of the closing wheel arm 54 are fixed or coupled together (e.g., via a weld) so that the link 90 does not move relative to the closing wheel arm 54. The link 92 includes ends 104 and 106. The end 106 includes a slot 108 to receive the end 60 of the closing wheel shaft 58. The end 106 of the link 92 and the end 60 of the closing wheel shaft 58 are fixed or coupled together (e.g., via a weld) so that the link 92 and the closing wheel shaft 58 move together.

The end 98 of the link 90 includes a gear 110 having teeth 112 (e.g., tapered teeth or teeth of another shape). The knob assembly 94 includes ends 114 and 116 and a cage portion 118 extending between the ends 114 and 116. Tabs 120 are circumferentially 69 spaced apart on the end 114 (and the rotational axis 76 of the pivot joint 68 shown in FIG. 5). Gear 122 having teeth 124 (e.g., tapered teeth or teeth of another shape) is disposed on the end 116 of the knob assembly 94. The teeth 112 of the gear 110 interface with the teeth 124 of the gear 122 to form interlocking teeth 126. The teeth 124 are located vertically 36 along the rotational axis 76 directly above the teeth 112.

The end 98 of the link 90, the end 104 of the link 92, and the knob assembly 94 are vertically 36 aligned along the rotational axis 76 of the pivot joint 68 with the end 98 disposed between the end 104 and the knob assembly 94. In particular, each of the end 98, the end 104, and the knob assembly 94 include respective openings that are vertical 36 aligned along the rotational axis 76 of the pivot joint 68. A shaft 128 extends in the direction 36 through the respective openings of the end 98, the end 104, and the knob assembly 94. The shaft 128 includes end 130 (e.g., head) and end 132.

The end 130 of the shaft 128 is coupled or fixed (e.g., via a weld) so that the shaft 128 does not move relative to the closing wheel shaft 58.

The cage portion 118 of the knob assembly 94 extends circumferentially 69 about a portion of the shaft 128 adjacent the end 132 to form a concentric arrangement with the shaft 128. The shaft 128 includes a recess or notch 134 that extends along a longitudinal axis of the shaft 128 in the vertical direction 36. The knob assembly 94 includes a base or platform 129 (e.g., annular base or platform) adjacent the end 116 extending in a direction crosswise to the rotational axis 76 from the knob assembly 94 to the shaft 128. An extension or protrusion 136 of the base 129 extends in a direction crosswise to the rotational axis 76 from the knob assembly 94 into the recess 134. This maintains the position of the knob assembly 94 relative to the shaft 128 as the knob assembly 94 is rotated to adjust the angle of the closing wheel 52.

The tabs 120 are configured to enable the lifting of the knob assembly 94 in the vertical direction 32 along the rotational axis 76 and the turning of the knob assembly 94 in the circumferential direction 69 to adjust the angle of the closing wheel 52. During rotation of the knob assembly 94, both the shaft 128, the link 92, and the closing wheel shaft 58 rotate about the rotational axis 76 relative to the closing wheel arm 54. The number of tabs 120 may vary (e.g., 1, 2, 3, 4, or more). As depicted, four tabs 120 are disposed on the end 114. Upon setting the angle of the closing wheel 52 to a desired set angle point, the knob assembly 94 may be released so that the teeth 112 of the gear 110 interface with the teeth 124 of the gear 122 once again to form the interlocking teeth 126. A spring 138 is disposed about the portion of the shaft 128 adjacent the end 132. The spring 138 applies a force to the base 129 of the knob assembly 94 to maintain the angle of the closing wheel 52 via interaction of the teeth 112, 124 forming the interlocking teeth 126. The spring 138 is not shown in FIG. 8 to enable the interaction between the protrusion 136 of the knob assembly 94 and the notch 134 of the shaft 128 to be seen.

The number and size of the teeth 112, 124 on the respective gears 110, 112 may vary. In particular, the number and size of the teeth 112, 124 may vary based on the number desired set angle positions for the angle of the closing wheel 52. For example, utilizing fewer and larger teeth 112, 124 than those depicted in FIGS. 6-8 provides a lower number of set angle positions.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A row unit closing wheel assembly, comprising:
a closing wheel;
a closing wheel arm;
a closing wheel shaft having a first end and a second end, wherein the closing wheel is coupled to the first end and the closing wheel arm is coupled to the second end via a pivot joint; and
an adjustable mechanical assembly disposed at the pivot joint, wherein the adjustable mechanical assembly is configured to adjust an angle of the closing wheel shaft relative to the closing wheel arm along a horizontal plane via movement of the closing wheel shaft about the pivot joint, the horizontal plane being orthogonal to a rotational axis of the pivot joint, and wherein the adjustable mechanical assembly comprises interlocking teeth and is configured to utilize the interlocking teeth to adjust the angle.

2. The row unit closing wheel assembly of claim 1, wherein the adjustable mechanical assembly is configured to adjust the angle between a plurality of set angle points relative to an initial set angle point.

3. The row unit closing wheel assembly of claim 2, wherein the angle at the initial set angle point is a substantially orthogonal angle.

4. The row unit closing wheel assembly of claim 3, wherein the angle for each set angle point of the plurality of set angle points other than the initial set angle point is greater than the angle for the initial set angle point.

5. The row unit closing wheel assembly of claim 1, wherein the adjustable mechanical assembly comprises comprise a first link coupled to the closing wheel arm and a second link coupled to the closing wheel shaft.

6. The row unit closing wheel assembly of claim 5, wherein the second link is configured to be rotated relative to the closing wheel arm during adjustment of the angle.

7. The row unit closing wheel assembly of claim 6, wherein a first link end of the first link and a second link end of the second link are vertically aligned along the rotational axis of the pivot joint.

8. The row unit closing wheel assembly of claim 7, wherein the adjustable mechanical assembly comprises a knob assembly having a first end and a second end, the first end comprises a plurality of tabs, and the second end comprises a first plurality of teeth, and the knob assembly is vertically aligned with the first link and the second link end along the rotational axis of the pivot joint.

9. The row unit closing wheel assembly of claim 8, wherein the second link end comprises a second plurality of teeth configured to interface with the first plurality of teeth to form the interlocking teeth.

10. The row unit closing wheel assembly of claim 9, wherein the knob assembly is configured both to be vertically lifted away from the second plurality of teeth along the rotational axis and to be rotated about the rotational axis to adjust the angle via the plurality of tabs.

11. The row unit closing wheel assembly of claim 10, wherein adjustable mechanical assembly comprises a shaft extending through the first link end, the second link end, and the knob assembly.

12. The row unit closing wheel assembly of claim 11, wherein the shaft is coupled to the second link and the knob assembly is coupled to the shaft, and wherein rotation of the knob assembly is configured to cause rotation of the shaft, the second link, and the closing wheel shaft.

13. The row unit closing wheel assembly of claim 11, wherein the adjustable mechanical assembly comprises a spring located about the shaft, and the spring is configured to apply a force to the knob assembly that keeps the first plurality of teeth interfacing with the second plurality of teeth to maintain the angle of the closing wheel shaft relative to the closing wheel arm.

14. An agricultural implement, comprising:
at least one row unit closing wheel assembly, comprising:
a closing wheel;
a closing wheel arm;
a closing wheel shaft having a first end and a second end, wherein the closing wheel is coupled to the first end and the closing wheel arm is coupled to the second end via a pivot joint; and
an adjustable mechanical assembly disposed at the pivot joint, wherein the adjustable mechanical assembly is configured to adjust an angle of the closing wheel shaft relative to the closing wheel arm along a horizontal plane via movement of the closing wheel shaft about the pivot joint, the horizontal plane being orthogonal to a rotational axis of the pivot joint, and wherein the adjustable mechanical assembly comprises a first gear having a first plurality of teeth and a second gear of having a second plurality of teeth, the first plurality of teeth and the second plurality of teeth interface to form interlocking teeth, and the adjustable mechanical assembly is configured to utilize the interlocking teeth to adjust the angle.

15. The agricultural implement of claim 14, wherein the angle at the initial set angle point is a substantially orthogonal angle.

16. The agricultural implement of claim 14, wherein the angle for each set angle point of the plurality of set angle points other than the initial set angle point is greater than the angle for the initial set angle point.

17. The agricultural implement of claim 14, wherein the agricultural implement comprises a disk drill.

18. The agricultural implement of claim 14, wherein the first gear is located on a link coupled to the closing wheel arm, the adjustable mechanical assembly comprises a knob assembly coupled to a shaft coupled to the closing wheel shaft, the second gear is located on an end of the knob assembly, and the knob assembly is configured to be rotated to cause rotation of the closing wheel shaft to change the angle.

19. A system for changing an angle for a closing wheel, comprising:
an adjustable mechanical assembly configured to couple to both a closing wheel shaft and a closing wheel arm of a closing wheel assembly having the closing wheel, wherein the adjustable mechanical assembly is configured to adjust the angle of the closing wheel shaft relative to the closing wheel arm along a horizontal plane via movement of the closing wheel shaft about a pivot joint coupling the closing wheel shaft to the closing wheel arm, the horizontal plane being orthogonal to a rotational axis of the pivot joint, and wherein the adjustable mechanical assembly comprises a first gear having a plurality of teeth and a second gear of having a plurality of teeth, the first plurality of teeth and the second plurality of teeth interface to form interlocking teeth, and the adjustable mechanical assembly is configured to utilize the interlocking teeth to adjust the angle.

20. The system of claim 19, wherein the first gear is located on a link configured to couple to the closing wheel arm, the adjustable mechanical assembly comprises a knob assembly coupled to a shaft configured to couple to the closing wheel shaft, the second gear is located on an end of the knob assembly, and the knob assembly is configured to be rotated to cause rotation of the closing wheel shaft to change the angle.

\* \* \* \* \*